(12) United States Patent
Terazono (10) Patent No.: US 6,640,863 B2
(45) Date of Patent: Nov. 4, 2003

(54) TIRE BUILDING DRUM

(75) Inventor: Toshiyuki Terazono, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 65 days.

(21) Appl. No.: 09/834,943

(22) Filed: Apr. 16, 2001

(65) Prior Publication Data

US 2001/0050148 A1 Dec. 13, 2001

(30) Foreign Application Priority Data

Apr. 14, 2000 (JP) ........................................ 2000-112985

(51) Int. Cl.$^7$ ................................................ B29D 30/26
(52) U.S. Cl. ........................ 156/402; 156/398; 156/415
(58) Field of Search ................................ 156/131, 132, 156/135, 398, 402, 403, 399, 400, 401, 414–416

(56) References Cited

U.S. PATENT DOCUMENTS

| | | |
|---|---|---|
| 3,402,090 A | 9/1968 | Henley |
| 4,131,500 A | 12/1978 | Wilde et al. |
| 4,325,764 A * | 4/1982 | Appleby et al. ............. 156/398 |
| 4,472,233 A * | 9/1984 | Fukamachi et al. .......... 156/415 |
| 5,273,599 A * | 12/1993 | Adachi ........................ 156/131 |
| 5,273,612 A | 12/1993 | Suetomi et al. |
| 6,012,500 A * | 1/2000 | Connor ........................ 156/398 |

FOREIGN PATENT DOCUMENTS

| | | | |
|---|---|---|---|
| DE | 4416514 A1 * | 11/1994 | .................. 156/131 |
| EP | 71840 A1 * | 2/1983 | .................. 156/415 |
| EP | 0 792 739 A2 | 9/1997 | |

* cited by examiner

Primary Examiner—Geoffrey L. Knable
(74) Attorney, Agent, or Firm—Sughrue Mion, PLLC (57) ABSTRACT

A tire building drum comprises a main drum shaft, a pair of movable bodies, approaching-separating means for moving these movable bodies in opposite directions, plural bead lock segments movably supported by each of the movable bodies in a radial direction, enlarging-contracting means for synchronously moving these bead lock segments in the radial direction, a seal member, a hollow cylindrical body and plural turnup fingers, wherein the seal member comprises an inner elongated portion extending inward from its base end part airtightly fixed to the movable body in the axial direction and an outer elongated portion extending outward from an inner end of the inner elongated portion in the axial direction.

5 Claims, 5 Drawing Sheets

TIRE BUILDING DRUM

BACKGROUND OF THE INVENTION

1. Field of the Invention

This invention relates to a tire building drum for deforming tire constitutional members in an approximately toroidal form to build a green tire.

2. Description of Related Art

Figure 6:
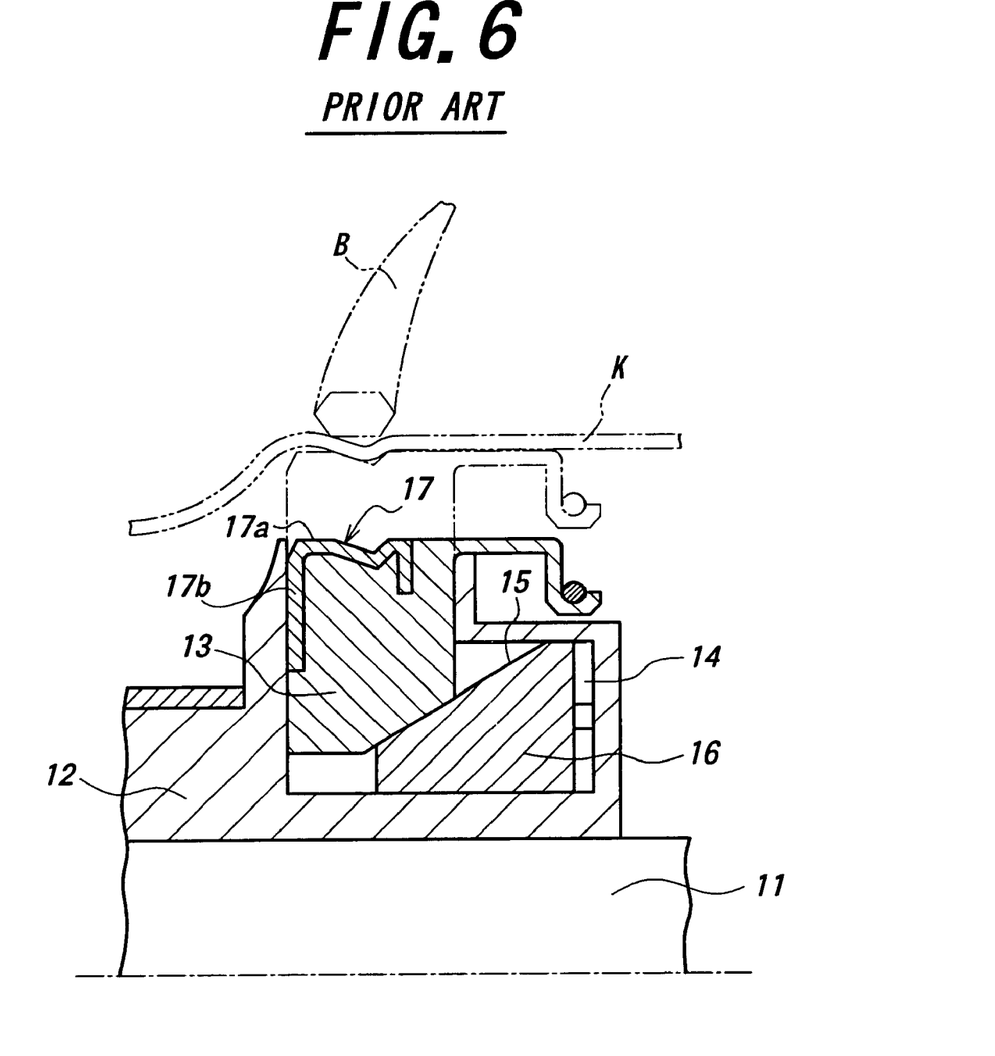
FIG. 6 is a diagrammatically front section view in the vicinity of bead lock segments in the conventional tire building drum.

As a conventional tire building drum, as shown in FIG. 6, there is known a drum comprising a main drum shaft 11, a pair of movable bodies 12 movably supported by the main drum shaft 11 in an axial direction, plural bead lock segments 13 movably supported by each of the movable bodies 12 in a radial direction, a piston 16 as an enlarging-contracting means movably housed in the movable body 12 in the axial direction and moving outward in the axial direction so as to synchronously move the bead lock segments 13 along a slant face 15 in the radial direction and enlarge or contract them when a high pressure fluid is fed to a fluid chamber 14 formed together with the movable body 12, and a seal member 17 sealing a space among the movable body 12, bead lock segments 13 and a tire constitutional member K when the tire constitutional member K is supported by the bead lock members 13 enlarged by the piston 16 from an inside in the radial direction.

The seal member comprises a cylindrical portion 17a covering a radially outer end face of the bead lock segment 13 and a width-wide elongated portion 17b extending inward from an axially outer end of the cylindrical portion 17a in the radial direction while closing to an axially outer face of the bead lock segment 13. The elongated portion 17b slidably contacts with the movable body 12 when it moves in the radial direction together with the bead lock segment 13.

In such a conventional tire building drum, however, since the elongated portion 17b of the seal member 17 extending in the radial direction is wider in the width, there is a problem that when the bead lock segments 13 move outward in the radial direction while elongating the seal member 17, they are subjected to a large resistance and hence an ability as an apparatus (speed) lowers. And also, the elongated portion 17b of the seal member 17 generates a large frictional resistance due to the slidable contacting with the movable body 12 when the bead lock segments 13 move outward in the radial direction as mentioned above, so that the ability as the apparatus further lowers.

SUMMARY OF THE INVENTION

It is, therefore, an object of the invention to provide a tire building drum developing a higher ability by mitigating a load fed by the enlarging-contracting means.

According to the invention, there is the provision of in a tire building drum comprising a main drum shaft, a pair of movable bodies movably supported by the main drum shaft in an axial direction, approaching-separating means for moving these movable bodies in opposite directions so as to approach or separate them, plural bead lock segments movably supported by each of the movable bodies in a radial direction, enlarging-contracting means for synchronously moving these bead lock segments in the radial direction so as to enlarge or contract them, a seal member sealing a space among the movable body, bead lock segments and a tire constitutional member when the tire constitutional member is supported by the bead lock segments enlarged by the enlarging-contracting means from an inside in the radial direction, a hollow cylindrical body movably fitted onto an outside of the movable body in the axial direction and plural turnup fingers each rotatably connected at its base end part to an axially outer end portion of the hollow cylindrical body and arranged so as to extend substantially inward in the axial direction and separate away in a circumferential direction, an improvement wherein the seal member comprises an inner elongated portion extending inward from the base end part airtightly fixed to the movable body axially located at the inside of the bead lock segment in the axial direction and an outer elongated portion extending outward from an inner end of the inner elongated portion in the axial direction and covering radially outer portions of the bead lock segments at its top end part.

As mentioned above, since the seal member comprises the inner elongated portion extending inward from the base end part in the axial direction and the outer elongated portion extending outward from the inner end of the inner elongated portion in the axial direction, when the top end part of the outer elongated portion is enlarged by moving the bead lock segments outward in the radial direction, the inner and outer elongated portions are merely deformed in V-shaped form at section and a large resistance is not caused to the bead lock segment and hence a load applied to the enlarging-contracting means can be mitigated to increase the ability as an apparatus (speed). And also, the seal member does not frictionally contact with the movable body when the bead lock segments move in the radial direction, so that the load applied to the enlarging-contracting means can be further mitigated to more enhance the ability as the apparatus.

In a preferable embodiment of the invention, an outer face of the top end part of the outer elongated portion is subjected to an adhesion-preventing treatment for preventing the adhesion to the tire constitutional member. Thus, when the bead lock segments move in the radial direction, the top end part of the seal member (the outer elongated portion) is easily peeled off from the tire constitutional member (green tire), whereby the resistance is decreased and the turning-over of the seal member is prevented.

In another preferable embodiment of the invention, a stopper body restricting an inner moving quantity of the hollow cylindrical body is interposed between an axially outer part of the movable body and the hollow cylindrical body and a fixing body for fixing the stopper body while adjusting an axial position thereof is arranged on an axially outer end of the movable body. Thus, a swinging quantity of the turnup fingers (turnup height of the tire constitutional member) can easily be adjusted from exterior without decomposing the drum.

In the other preferable embodiment of the invention, the enlarging-contracting means comprises a piston movably housed in a cylinder chamber in the axial direction and plural links connecting the piston to the bead lock segments so as to enlarge or contract the bead lock segments by alternately feeding a fluid into the cylinder chamber located at both sides of the piston. Thus, the bead lock segments can be strongly moved at a high speed in the radial direction to improve the operation efficiency.

In a further preferable embodiment of the invention, a finger receiver projecting outward in the axial direction is arranged at the outer end portion of the bead lock segment in the radial direction so as to place the top end part of the turnup finger on the finger receiver. Thus, the top end part of the turnup fiber moves together with the bead lock segments outward in the radial direction, whereby the occurrence of wrinkles and the flowing of air are prevented in a turnup portion of the tire constitutional member.

In a still further preferable embodiment of the invention, each of the bead lock segments, turnup fingers and seal member is exchangeable so as to exchange them in accordance with a given tire size in the building of tires having various sizes. Thus, tires having different sizes can easily be built without exchanging the drum.

BRIEF DESCRIPTION OF THE DRAWINGS

The invention will be described with reference to the accompanying drawings, wherein.

DETAILED DESCRIPTION OF THE INVENTION

Figure 1:
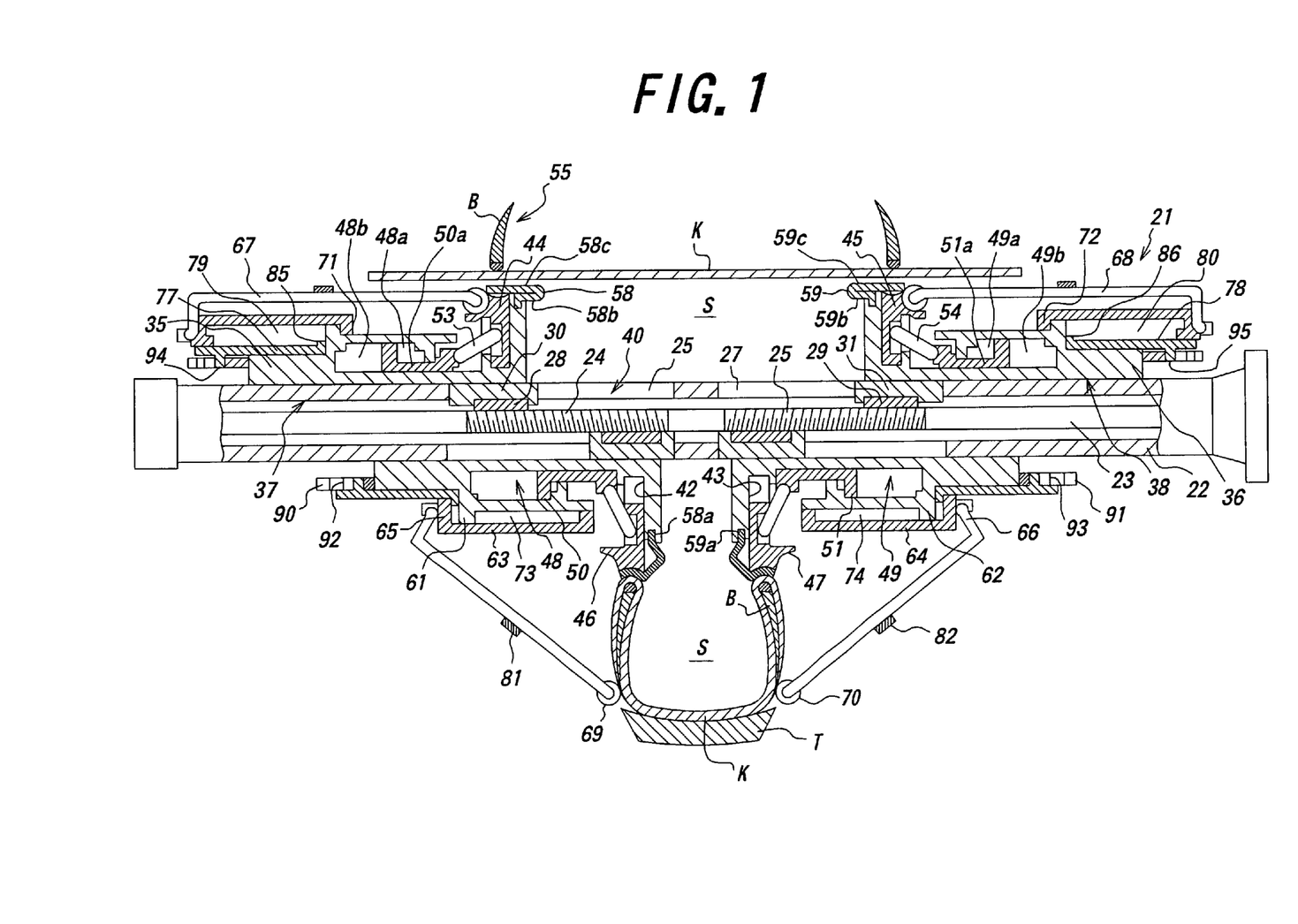
FIG. 1 is a diagrammatically front section view of an embodiment of the tire building drum according to the invention wherein an upper half illustrates a state after the sending in of tire constitutional members and a lower half illustrates a state after the turnup of the tire constitutional members.
Figure 2:
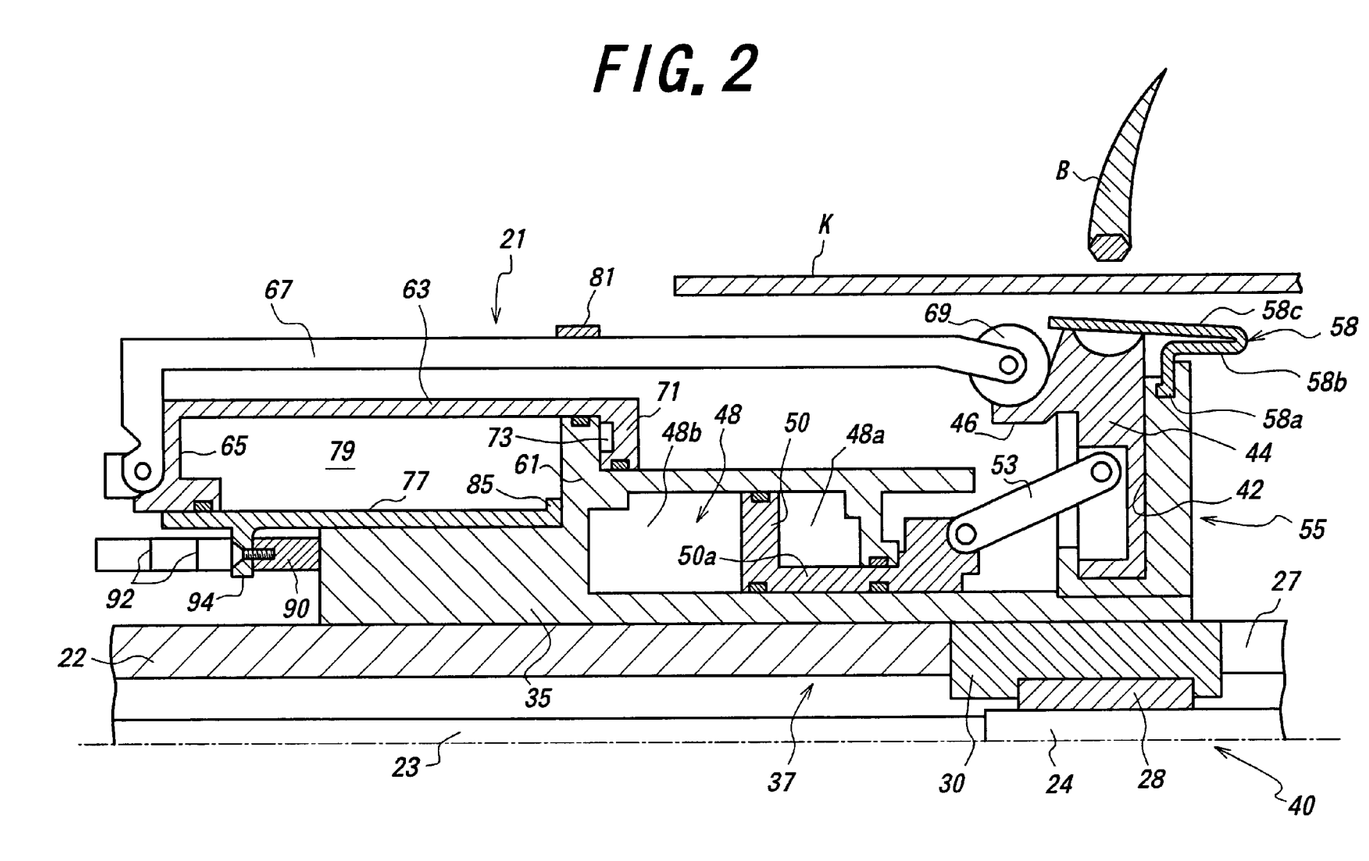
FIG. 2 is a diagrammatically front section view in the vicinity of bead lock segments.

In FIGS. 1 and 2, numeral 21 is a tire building drum used in the building of a green tire. The tire building drum 21 comprises a horizontal cylindrical main drum shaft 22. The main drum shaft 22 is connected to a driving part of a tire building apparatus (not shown) and rotated about an axial line by such a driving part, if necessary.

A screw shaft 23 is coaxially and rotatably inserted into the main drum shaft 22, and male threaded parts 24, 25 oppositely threading to each other are formed on outer peripheries at both sides in the vicinity of a center of the screw shaft 23 in an axial direction. And also, plural slits 26, 27 extending in the axial direction are formed in the main drum shaft 22 at positions overlapping with the male threaded parts 24, 25. These slits 26, 27 are arranged at equal separating distances in a peripheral direction of the main drum shaft 22. Numerals 28, 29 are female threaded parts engaging with the respective male threaded parts 24, 25. These female threaded parts 28, 29 are fixed to connecting blocks 30, 31 passing through the slits 26, 27, respectively.

Numerals 35, 36 are slide bodies of approximately cylindrical form surrounding the main drum shaft 22, which are arranged on both side portions of the main drum shaft 22 and movably supported by the main drum shaft 22 in the axial direction. To axially inner end portion of the slide bodies 35, 36 are connected the connecting blocks 30, 31, respectively. The connecting blocks 30, 31 and the slide bodies 35, 36 as a whole form a pair of movable bodies 37, 38 movably supported toward both end portions of the main drum shaft 22 in the axial direction.

When the screw shaft 23 is rotated by the driving part of the tire building apparatus, these movable bodies 37, 38 are moved by equal distance in opposite directions through the male threaded parts 24, 25 to approach to or separate away from each other. That is, the screw shaft 23 and female threaded parts 28, 29 as a whole form an approaching-separating means for approaching the movable bodies to or separating from each other by moving them by the equal distance.

In axially inner end portions of the slide bodies 35, 36 are formed plural housing holes 42, 43 extending in the radial direction, respectively, and these housing holes 42, 43 are arranged by equal separating distances in the peripheral direction, respectively. In the respective housing holes 42, 43 of the movable bodies 37, 38 are movably inserted and supported plural bead lock segments 44, 45 in the radial direction, respectively. In the radially outer end portions of the bead lock segments 44, 45 are formed finger receivers 46, 47 projecting outward in the axial direction, respectively. On these finger receivers 46, 47 are placed top end parts of turnup fingers as mentioned later, particularly rollers of the turnup fingers, respectively. In this case, the radially outer ends of the rollers locate at substantially the same radial positions as radially outer ends of the bead lock segments 44, 45.

Numerals 48, 49 are ring-shaped cylinder chambers formed in the slide bodies 35, 36. In these cylinder chambers 48, 49 are movably housed ring-shaped pistons 50, 51 in the axial direction, which partition the cylinder chambers 48, 49 into inner chamber parts 48a, 49a and outer chamber parts 48b, 49b. In these pistons 50, 51 are integrally formed elongated parts 50a, 51a passing through axially inner walls of the cylinder chambers 48, 49 and extending inward in the axial direction, respectively. Numerals 53, 54 are plural links each rotatably connected at its one end to the respective bead lock segment 44, 45 and at the other end to the respective axially inner end portion of the elongated part 50a, 51a. These links 53, 54 are inclined so as to enlarge inward in the axial direction, respectively.

When a high pressure fluid is supplied from a fluid source (not shown) into the inner chamber parts 48a, 49a of the cylinder chambers 48, 49, the pistons 50, 51 are moved outward in the axial direction to move the bead lock segments 44, 45 inward in the radial direction, while when the high pressure fluid is supplied into the outer chamber parts 48b, 49b, the pistons 50, 51 are moved inward in the axial direction to move the bead lock segments 44, 45 outward in the radial direction. The pistons 50, 51 and the links 53, 54 connecting the pistons 50,51 to the bead lock segments 44,45 as a whole form enlarging-contracting means 55 for enlarging and contracting the bead lock segments 44, 45 while synchronously moving them in the radial direction.

When the high pressure fluid is alternately supplied to the inner chamber parts 48a, 49a and the outer chamber parts 48b, 49b of the cylinder chambers 48, 49 located at both sides of the pistons 50, 51 to elongate and contract the bead lock segments 44, 45 as mentioned above, the bead lock segments 44, 45 can be strongly moved at a high speed in the radial direction as compared with a case of returning the bead lock segments inward in the radial direction through elastic restoring force of a spring, whereby the operation efficiency can be improved.

Numerals 58, 59 are a pair of seal members each made of rubberized cord fabric. These seal members 58, 59 seal spaces among the movable bodies 37, 38, the bead lock segments 44, 45 and a tire constitutional member K as mentioned later when the tire constitutional member K is supported from an inside thereof in the radial direction by the bead lock segments 44, 45 enlarged by the enlarging-contracting means 55.

Each of the seal members 58, 59 comprises a base end portion 58a, 59a airtightly fixed by the movable body 37, 38 (slide body 35, 36) located inward from the bead lock segments 44, 45 in the axial direction. And also, a cylindrical inner elongated portion 58b, 59b of the seal member 58, 59 extends inward from a radially outer end of the base end portion 58a, 59a in the radial direction. Furthermore, a cylindrical outer elongated portion 58c, 59c having a width wider than that of the inner elongated portion 58b, 59b is continuously connected to an axially inner end of the inner elongated portion 58b, 59c and extends outward in the axial direction while overlapping with a radially outer face of the inner elongated portion 58b, 59b.

Since only one position folded by approximately 180 degrees is existent, the seal members 58, 59 are strong to repetitive deformation and long in the service life as compared with a case of existing plural folded positions such as bellows. Top end parts of the outer elongated portions 58c, 59c (radially outer end parts) cover the bead lock segments 44, 45 from an outside in the radial direction, while an outer face of the top end part is subjected to an adhesion preventing treatment for preventing the adhesion to the tire constitutional member K such as application of liquid silicon, surface roughening or the like.

Since each of the seal members 58, 59 has the above structure, when the top end parts of the outer elongated portions 58c, 59c are enlarged by moving the bead lock segments 44, 45 outward in the radial direction, the inner elongated portions 58b, 59b and the outer elongated portions 58c, 59c are only deformed so as to open in V-shaped form at section, so that the seal members 58, 59 does not produce large resistance in the enlarging of the bead lock segments 44, 45 and hence load applied to the enlarging-contracting means 55 is mitigated to increase the ability as the apparatus (speed). And also, the seal members 58, 59 do not frictionally contact with the slide bodies 35, 36 when the bead lock segments 44, 45 are moved in the radial direction, so that the load applied to the enlarging-contracting means 55 can be more mitigated to further enhance the ability as the apparatus.

As the outer surfaces of the top end parts of the outer elongated portions 58c, 59c are subjected to the adhesion preventing treatment, when the bead lock segments 44, 45 are moved inward in the radial direction, the top end parts of the outer elongated portions 58c, 59c are easily peeled off from the tire constitutional member K (green tire), whereby the resistance is reduced in the contracting of the bead lock segments 44, 45 and also the turning-over of the seal member 58, 59 is prevented.

Numerals 61, 62 are flanges formed on the movable bodies 37, 38, particularly outer faces in axially central portions of the slide bodies 35, 36, respectively, and hollow cylindrical bodies 63, 64 are movably fitted onto outsides of these flanges 61, 62 in the axial direction. Numerals 65, 66 are flanges integrally formed on inner faces of axially outer end portions of the hollow cylindrical bodies 63, 64, respectively. To these flanges 65, 66 are rotatably connected plural base end parts of turnup fingers 67, 68 (radially outer end parts). These turnup fingers 67, 68 extend inward substantially in the axial direction and their top ends (axially inner ends) rotatably support the rollers 69, 70.

Numerals 71, 72 are ring-shaped flanges integrally formed on inner faces of the radially inner end parts of the hollow cylindrical bodies 63, 64, respectively. These flanges 71, 72 slidably contact with the slide bodies 35, 36 at the insides of the flanges 61, 62 in the axial direction. When the high pressure fluid is supplied from the fluid source (not shown) to inner cylinder chambers 73, 74 defined between the flange 61, 62 and the flange 71, 72, the hollow cylindrical bodies 63, 64 move inward in the axial direction. At the same time, the turnup fingers 67, 68 are elongated while moving inward in the axial direction together with the hollow cylindrical bodies 63, 64 to turn up the tire constitutional member K located outward from a filler-provided bead B in the axial direction around the filler-provided bead B.

Numerals 77, 78 are cylindrical stopper bodies fitted onto the slide bodies 35, 36 located outward from the flanges 61, 62 in the axial direction. The flanges 65, 66 are slidably engaged with the outer faces of these stopper bodies 77, 78. As a result, the stopper bodies 77, 78 are interposed between the axially outer end parts of the movable bodies 37, 38 and the hollow cylindrical bodies 65, 66, respectively. When the high pressure fluid is supplied to outer cylinder chambers 79, 80 defined between the flanges 61, 62 and the flanges 65, 66, the turnup fingers 67, 68 are contracted while moving outward in the axial direction together with the hollow cylindrical bodies 63,64.

Numerals 81, 82 are restoring members such as rubber bands or the like attached to central portions of the turnup fingers 67, 68 in a longitudinal direction, respectively. When the turnup fingers 67, 68 move outward in the axial direction as mentioned above, these restoring members 81, 82 give an energizing force to the turnup fingers 67, 68 to swing them in a contracting direction. On the axially inner ends of the stopper bodies 77,78 are integrally formed flange-shaped stoppers 85, 85 projecting outward in the radial direction. These stoppers 85, 86 define axially inward moving limits of the hollow cylindrical bodies 63, 64 when they contact with the flanges 65, 66 to stop the movements of the hollow cylindrical bodies 63, 64.

Figure 3:
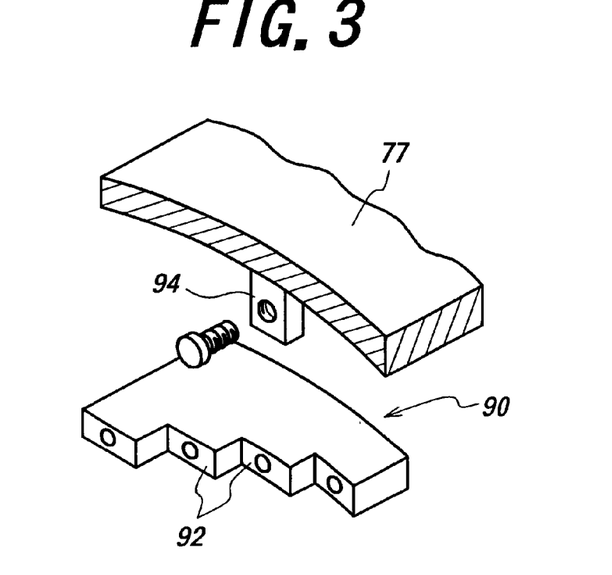
FIG. 3 is a perspective view of a fixing body.

In FIGS. 1 to 3, numerals 90, 91 are adjustment blocks as a fixed body fixed to the axially outer ends of the slide bodies 35, 36, respectively. The axially outer end parts of these adjustment blocks 90, 91 are worked into a step to form plural stepwise faces 92, 93 having different distances from the slide bodies 35, 36, respectively. Numerals 94, 95 are fixing pieces formed on the inner faces of the stopper bodies 77, 78, respectively. These fixing pieces 94, 95 are detachably fixed to the adjustment blocks 90, 91 at a state of contacting with any of the stepwise faces 92, 93, respectively. The axially attaching position of the stopper body 77, 78 to the movable body 37, 38 can be adjusted by changing the stepwise face 92, 93 contacting with the fixing piece 94, 95.

The action of the illustrated embodiment of the tire building drum according to the invention will be described below.

When a green tire is built by using the above tire building drum 21, the tire constitutional member K shaped into a cylindrical form by the other shaping drum, the filler-provided bead B and a belt-tread band T are first placed and fitted on an outer face of the tire building drum 21 through a transferring apparatus.

Figure 4:
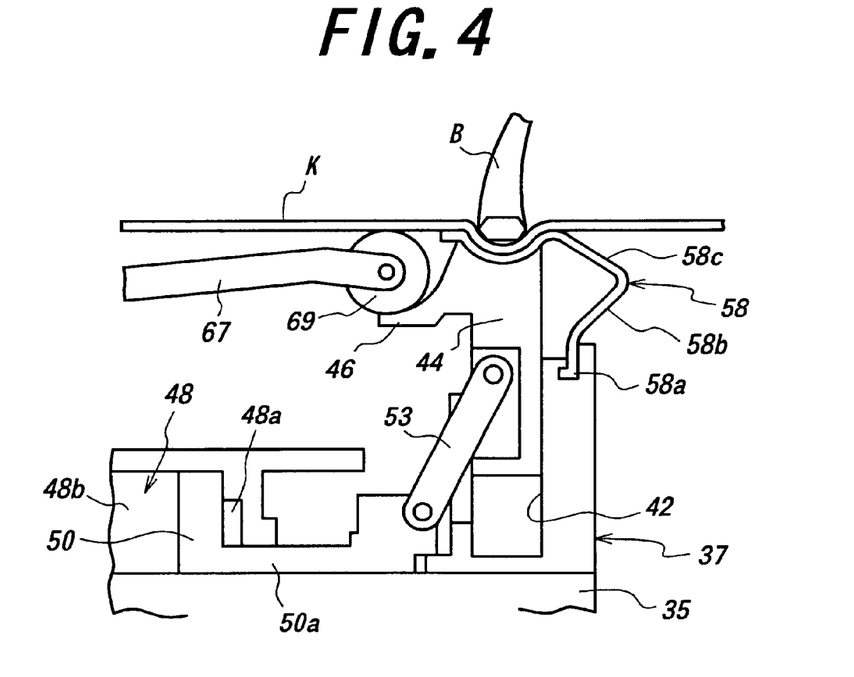
FIG. 4 is a diagrammatically front section view illustrating a state of supporting the tire constitutional members by the bead lock segments.

Then, the high pressure fluid is supplied to the outer chamber parts 48b, 49b of the cylinder chambers 48, 49 to move the pistons 50, 51 inward in the axial direction. In this case, since the bead lock segments 44, 45 are connected to the pistons 50, 51 through the links 53, 54, these bead lock segments 44, 45 are moved outward in the radial direction and enlarged while being guided with the housing holes 42, 43, whereby the tire constitutional member K and the filler-provided bead B are supported from the inside in the radial direction through the outer elongated portions 58c, 59c of the seal members 58, 59 as shown in FIG. 4.

In this case, the inner and outer elongated portions 58b, 59b, 58c, 59c of the seal members 58, 59 are merely deformed to open in a V-shaped form at section, so that a large resistance is not produced in the enlargement of the bead lock segments 44, 45 and hence the ability of the enlarging-contracting means is not damaged.

Since the rollers 69, 70 of the turnup fingers 67, 68 are placed on the finger receivers 46, 47 of the bead lock segments 44, 45, these rollers 69, 70 are moved by equal distances outward in the radial direction together with the bead lock segments 44, 45 to somewhat swing the turnup fingers 67, 68 in an enlarging direction. As a result, a portion of the tire constitutional member K located outward from the filler-provided bead B in the axial direction is always supported from the inside in the radial direction by the turnup fingers 67, 68, so that there is caused no stepwise difference due to the falling down from the axially outer end faces of the bead lock segments 44, 45.

Then, air is supplied into a space S defined between the slide bodies 35, 36 and a portion of the tire constitutional member K between the filler-provided beads B, while the screw shaft 23 is rotated to move the movable bodies 37, 38, bead lock segments 44, 45 and turnup fingers 67, 68 through the male threaded parts 24, 25 and approach them to each other. Thus, the portion of the tire constitutional member K between the filler-provided beads B is gradually deformed into a toroidal shape.

As the movable bodies 37, 38 are moved up to given positions inward in the axial direction, the rotation of the screw shaft 23 is stopped, but air is continuously supplied to the space S even after the stopping of the movable bodies. As a result, the portion of the tire constitutional member K deforming into the toroidal shape contacts with the belt-tread band T and an axially central part thereof closely adheres to the inner periphery of the belt-tread band T. In this case, an internal pressure of the space S is held by the seal members 58, 59.

Figure 5:
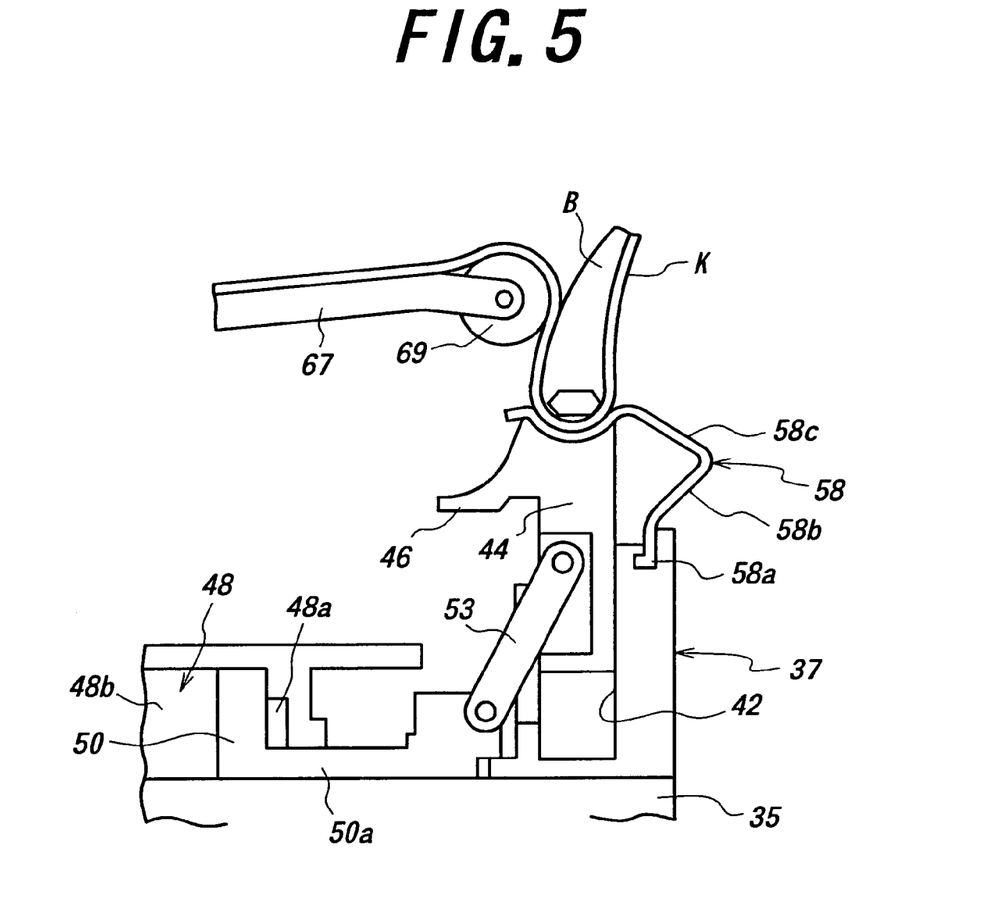
FIG. 5 is a diagrammatically front section view illustrating a state of turning up the tire constitutional member.

Then, the hollow cylindrical bodies 63, 64 and the turnup fingers 67, 68 are moved inward in the axial direction by supplying a high pressure fluid to the inner cylinder chambers 73, 74. In this case, the rollers 69, 70 push onto the filler-provided beads B extending substantially in the radial direction and move along the axially outer faces of the filler-provided beads B substantially outward in the radial direction, whereby the portion of the tire constitutional member K located outward from the filler-provided bead B in the axial direction is turned up outward along the filler-provided bead B in the radial direction. And also, the turnup fingers 67, 68 are synchronously swung in an enlarging direction by the movement of the rollers 69, 70 outward in the radial direction.

In this case, the step difference is not caused in the portion of the tire constitutional member K located outward from the bead lock segments 44, 45 in the axial direction as previously mentioned, so that even when the tire constitutional member K is turned up around the filler-provided bead B, there is caused no wrinkle in such a turnup portion. Furthermore, the rollers 69, 70 are placed on the finger receivers 46, 47 and located extremely near to the tire constitutional member K at the time of starting the turning of the tire constitutional member K, so that there is caused no penetration of air between the tire constitutional member K and the filler-provided bead B in the turning of the tire constitutional member K.

When the portion of the tire constitutional member K located outward from the filler-provided bead B in the radial direction is completely turned by the rollers 69, 70 of the turnup fingers 67, 68 swinging in the enlarging direction, the flanges 65, 66 of the hollow cylindrical bodies 63, 64 contact with the stoppers 85, 85 of the stopper bodies 77, 78 to stop the movement of the hollow cylindrical bodies 63, 64 inward in the axial direction, respectively. Such a state is shown in a lower half of FIG. 1.

Thereafter, the hollow cylindrical bodies 63, 64 and the turnup fingers 67, 68 are moved outward in the axial direction by supplying the high pressure fluid to the outer cylinder chambers 79, 80 until the flanges 71, 72 push onto the flanges 61, 62, respectively. In this case, the turnup fingers 67, 68 swing in a contracting direction until the rollers 69, 70 are placed on the finger receivers 46, 47 by the elastic restoring force of the restoring members 81, 82, respectively. Then, the belt-tread band T is stitched by a stitching device (not shown) while rotating the main drum shaft 22 and pressed onto the tire constitutional member K to form a green tire.

After the green tire is grasped from the outside in the radial direction by a transferring device (not shown), air is discharged out from the space S and the high pressure fluid is supplied to the inner chamber parts 48a, 49a of the cylinder chambers 48, 49 to move the bead lock segments 44, 45 inward in the radial direction, whereby the green tire is delivered from the bead lock segments 44, 45 to the transferring device. In this case, the outer faces of the top end parts of the outer elongated portions 58c, 59c are subjected to an adhesion preventing treatment, so that the outer elongated portions 58c, 59c of the seal members 58,59 are easily peeled off from the tire constitutional member K (green tire), whereby the resistance in the movement of the bead lock segments 44, 45 inward in the radial direction is decreased, while it is prevented to turn over the outer elongated portions 58c, 59c.

While the green tire is carried out from the tire building drum 21 by the transferring device, the screw shaft 23 is rotated in a direction opposite to the above rotating direction to return the movable bodies 37, 38, the bead lock segments 44, 45 and the turnup fingers 67, 68 to initial positions, respectively. The above procedure is one cycle of forming the green tire. By repeating this cycle are successively formed green tires having the same size.

In case of forming green tires having the same outer diameter (inch) but different size, the turnup height of the tire constitutional member K differs every the size, so that it is necessary to change the swinging quantity of the turnup finger 67, 68 in accordance with the desired turnup height. For this end, according to the conventional technique, the stopper (e.g. bolt) is disposed on the movable body in the vicinity of the bead lock segment, so that after the turnup finger is taken out from the tire building drum, the above stopper is made to an adequate length (change of bolt length) and hence such an operation becomes complicated and troublesome.

In the illustrated embodiment according to the invention, however, the adjustment blocks 90, 91 defining the axial positions of the stopper bodies 77, 78 or axially inner moving limits of the turnup fingers 67, 68 are arranged on the axially outer ends of the movable bodies 37, 38, respectively, so that an operation of adjusting the axial positions of the stopper bodies 77, 78 in accordance with the turnup height of the tire constitutional member K, i.e. operation of fixing the fixing pieces 94, 95 to adequate stepwise faces 92, 93 can be made from the outside of the tire building drum 21 and hence such an operation becomes simple and easy.

And also, the bead lock segments 44, 45, seal members 58, 59 and turnup fingers 67, 68 are exchangeable in the embodiment of the invention. For this end, even in case of forming green tires having a different outer diameter, it is enough to merely exchange the bead lock segments 44, 45, seal members 58, 59 and turnup fingers 67, 68 in correspondence to the desired tire size. In other words, the invention can easily be coped with the change of the tire size without exchanging the whole of the tire building drum 21. In the invention, therefore, green tires having many different inches can be formed only by the tire building drum 21, so that the number of tire building drums separately reserved can be reduced.

In the illustrated embodiment, the adjustment blocks 90, 91 having plural stepwise faces 92, 93 are used as a fixing body, respectively. In the invention, however, plural adjustment blocks having different thicknesses are used as the fixing body and the adjustment block having an adequate thickness among these blocks may be fixed together with the fixing piece of the stopper body to the axially outer end of the movable body through bolt or the like.

As mentioned above, according to the invention, the load applied to the enlarging-contracting means can be mitigated to improve the ability of the building drum.

What is claimed is:

1. In a tire building drum comprising a main shaft, a pair of movable bodies movably supported by the main drum shaft in an axial direction, approaching-separating means for moving these movable bodies in opposite directions so as to approach or separate them, plural bead lock segments movably supported by each of the movable bodies in a radial direction, enlarging-contracting means for synchronously moving these bead lock segments in the radial direction so as to enlarge or contract them, a seal member sealing space among the movable body, bead lock segments and a tire constitutional member is supported by the bead lock segments enlarged by the enlarging-contracting means from an inside in the radial direction, a hollow cylindrical body movably fitted onto the outside of the movable body in the axial direction and plural turnup fingers each rotatably connected at a base end part thereof to an axially outer end portion of the hollow cylindrical body and arranged so as to extend substantially inward in the axial direction and separate away in a circumferential direction, an improvement wherein the seal member comprises an inner elongated portion extending axially inward from a base end part airtightly fixed to the movable body and located at the inside of the bead lock segment in the axial direction and an outer elongated portion extending outward from an inner end of the inner elongated portion in the axial direction and covering radially outer portions of the bead lock segments at its top end part; and wherein a finger receiver projecting outward in the axial direction is arranged at the outer end portion of the bead lock segment in the radial direction so as to place the top end part of the turnup finger on the finger receiver.

2. A tire building drum according to claim 1, wherein, an outer face of the top end part of the outer elongated portion is subjected to an adhesion-preventing treatment for preventing the adhesion to the tire constitutional member.

3. A tire building drum according to claim 1, wherein a stopper body restricting an inner moving quantity of the hollow cylindrical body is interposed between an axially outer part of the movable body and the hollow cylindrical body and a fixing body for fixing the stopper body while adjusting an axial position thereof is arranged on an axially outer end of the movable body.

4. A tire building drum according to claim 1, wherein the enlarging-contracting means comprises a piston movably housed in a cylinder chamber in the axial direction and plural links connecting the piston to the bead lock segments so as to enlarge or contract the bead lock segments by alternately feeding a fluid into the cylinder chamber located at both sides of the piston.

5. A tire building drum according to claim 1, wherein each of the bead lock segments, turnup fingers and seal member is exchangeable so as to exchange them in accordance with a given tire size in the building of tires having various sizes.

\* \* \* \* \*